United States Patent
Dry (12)

(10) Patent No.: US 6,440,195 B1
(45) Date of Patent: Aug. 27, 2002

(54) PROCESS AND AN APPARATUS FOR PRODUCING METALS AND METAL ALLOYS

(75) Inventor: Rodney James Dry, City Beach (AU)

(73) Assignee: Technological Resources Pty. Ltd., Melbourne (AU)

( * ) Notice: Subject to any disclaimer, the term of this patent is extended or adjusted under 35 U.S.C. 154(b) by 0 days.

(21) Appl. No.: 09/509,323

(22) PCT Filed: Oct. 14, 1999

(86) PCT No.: PCT/AU99/00884

§ 371 (c)(1),
(2), (4) Date: Mar. 21, 2000

(87) PCT Pub. No.: WO00/22176

PCT Pub. Date: Apr. 20, 2000

(51) Int. Cl.[7] .............................................. C21B 13/12
(52) U.S. Cl. ............................. 75/453; 75/500; 75/501; 75/502
(58) Field of Search .......................... 75/500, 501, 502, 75/453

(56) References Cited

U.S. PATENT DOCUMENTS

| | | |
|---|---|---|
| 2,647,045 A | 7/1953 | Rummel |
| 3,844,770 A | 10/1974 | Nixon |
| 3,845,190 A | 10/1974 | Yosim et al. |
| 3,888,194 A | 6/1975 | Kishigami et al. |
| 3,890,908 A | 6/1975 | von Klenck et al. |

(List continued on next page.)

FOREIGN PATENT DOCUMENTS

| | | |
|---|---|---|
| AU | A-23864/84 | 1/1984 |
| AU | B-41064/85 | 4/1986 |
| AU | B-69707/87 | 9/1987 |
| AU | B-22448/88 | 5/1989 |
| AU | B-26831/88 | 7/1989 |
| AU | B-28802/89 | 8/1989 |

(List continued on next page.)

OTHER PUBLICATIONS

Patent Abstract of Japan, JP, A, 10–280020 (Nippon Steel Corp.), Oct. 20, 1998.
Patent Abstract of Japan, C–951, p. 24, JP, A, 04–63218 (Kawasaki Heavy Ind. Ltd), Feb. 28, 1992.
Patent Abstract of Japan, C–627, p. 109, Jp, A, 01–127613 (Kawasaki Steel Corp.), May 19, 1989.
WPAT print–out for Brazilian patent application PI9400123–5 (Weber).
Patent Abstracts of Japan, C–951, JP, A, 4–63217 (Kawasaki Heavy Ind. Ltd.), Feb. 28, 1992.
Patent abstracts of Japan, C–497, p. 115, JP, A, 62–280315 (Nippon Kokan K.K), Dec. 15, 1987.
Derwent Abstract Accession No. 87–039748/06 Class Q77, JP, A, 61–295334, Dec. 26, 1986.

*Primary Examiner*—Melvyn Andrews
(74) *Attorney, Agent, or Firm*—Merchant & Gould, P.C.

(57) ABSTRACT

A process and an apparatus for producing metals from a metalliferous feed material are disclosed. The process includes the steps of partially reducing and at least partially melting a metalliferous feed material in a pre-reduction/melting means and completely reducing the partially reduced feed material in a reduction means. The pre-reduction/melting means is positioned directly above the reduction means and communicates with the reduction means so that at least partially molten, partially reduced feed material flows downwardly into a central region of the reduction means. The reduction means includes a vessel that contains a molten bath having a metal layer and a slag layer on the metal layer. The process includes injecting oxygen-containing gas into the reduction means and post-combusting reaction gas generated in the molten bath and injecting oxygen-containing gas into the pre-reduction/melting means and post-combusting reaction gas discharged from the reduction means. The process further includes injecting solid carbonaceous material and a carrier gas into a metal rich region of the molten bath and causing upward movement of splashes, droplets and streams of molten material which forms a transition zone.

5 Claims, 2 Drawing Sheets

U.S. PATENT DOCUMENTS

Figure 1:
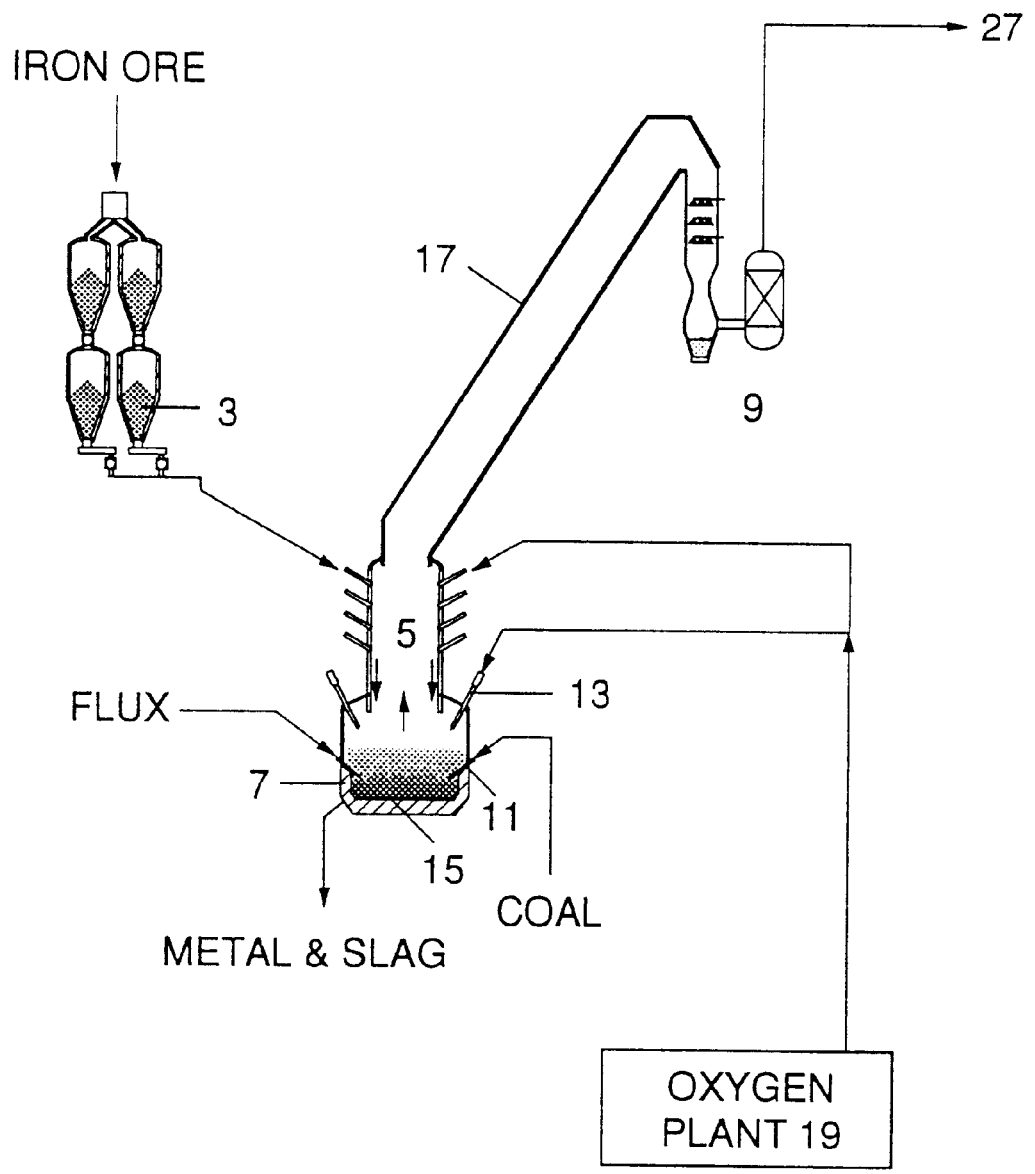

| | | |
|---|---|---|
| 3,894,497 A | 7/1975 | Helke et al. |
| 4,007,034 A | 2/1977 | Hartwig et al. |
| 4,053,031 A | 10/1977 | Stephens, Jr. |
| 4,145,396 A | 3/1979 | Grantham |
| 4,177,063 A | 12/1979 | Dickson |
| 4,207,060 A | 6/1980 | Zangs |
| 4,356,035 A | 10/1982 | Brotzmann et al. |
| 4,389,043 A | 6/1983 | Weber et al. |
| 4,400,936 A | 8/1983 | Evans |
| 4,402,274 A | 9/1983 | Meenan et al. |
| 4,431,612 A | 2/1984 | Bell et al. |
| 4,447,262 A | 5/1984 | Gay et al. |
| 4,455,017 A | 6/1984 | Wunsche |
| 4,468,298 A | 8/1984 | Byrne et al. |
| 4,468,299 A | 8/1984 | Byrne et al. |
| 4,468,300 A | 8/1984 | Byrne et al. |
| 4,481,891 A | 11/1984 | Takeshita et al. |
| 4,504,043 A | 3/1985 | Yamaoka et al. |
| 4,511,396 A | 4/1985 | Nixon |
| 4,565,574 A | 1/1986 | Katayama et al. |
| 4,566,904 A | 1/1986 | von Bogdandy et al. |
| 4,572,482 A | 2/1986 | Bedell |
| 4,574,714 A | 3/1986 | Bach et al. |
| 4,602,574 A | 7/1986 | Bach et al. |
| 4,664,618 A | 5/1987 | Gitman |
| 4,681,599 A | 7/1987 | Obkircher |
| 4,684,448 A | 8/1987 | Itoh et al. |
| 4,701,214 A | 10/1987 | Kaneko et al. |
| 4,718,643 A | 1/1988 | Gitman |
| 4,786,321 A | 11/1988 | Hoster et al. |
| 4,790,516 A | 12/1988 | Sugiura et al. |
| 4,798,624 A | 1/1989 | Brotzmann et al. |
| 4,849,015 A | 7/1989 | Fassbinder et al. ........... 75/501 |
| 4,861,368 A | 8/1989 | Brotzmann et al. |
| 4,874,427 A | 10/1989 | Hamada et al. |
| 4,890,562 A | 1/1990 | Gitman |
| 4,913,734 A | 4/1990 | Romenets et al. |
| 4,923,391 A | 5/1990 | Gitman |
| 4,940,488 A | 7/1990 | Maeda et al. |
| 4,946,498 A | 8/1990 | Weber |
| RE33,464 E | 11/1990 | Gitman |
| 4,976,776 A | 12/1990 | Elvander et al. |
| 4,999,097 A | 3/1991 | Sadoway |
| 5,005,493 A | 4/1991 | Gitman |
| 5,024,737 A | 6/1991 | Claus et al. |
| 5,037,608 A | 8/1991 | Tarcy et al. |
| 5,042,964 A | 8/1991 | Gitman |
| 5,050,848 A | 9/1991 | Hardie et al. |
| 5,051,127 A | 9/1991 | Hardie et al. .................. 75/553 |
| 5,065,985 A | 11/1991 | Takahashi et al. |
| 5,177,304 A | 1/1993 | Nagel |
| 5,191,154 A | 3/1993 | Nagel |
| 5,222,448 A | 6/1993 | Morgenthaler et al. |
| 5,238,646 A | 8/1993 | Tarcy et al. |
| 5,271,341 A | 12/1993 | Wagner |
| 5,279,715 A | 1/1994 | La Camera et al. |
| 5,301,620 A | 4/1994 | Nagel et al. |
| 5,302,184 A | 4/1994 | Batterham et al. |
| 5,322,547 A | 6/1994 | Nagel et al. |
| 5,332,199 A | 7/1994 | Knapp et al. |
| 5,333,558 A | 8/1994 | Lees, Jr. |
| 5,396,850 A | 3/1995 | Conochie et al. |
| 5,401,295 A | 3/1995 | Brotzmann |
| 5,407,461 A | 4/1995 | Hardie et al. |
| 5,415,742 A | 5/1995 | La Camera et al. |
| 5,443,572 A | 8/1995 | Wilkison et al. |
| 5,480,473 A | 1/1996 | Hardie et al. |
| 5,489,325 A | 2/1996 | Keogh et al. |
| 5,498,277 A | 3/1996 | Floyd et al. |
| 5,518,523 A | 5/1996 | Brotzmann |
| 5,529,599 A | 6/1996 | Calderon |
| 5,613,997 A | 3/1997 | Stachell, Jr. |
| 5,640,708 A | 6/1997 | Conochie et al. |
| 5,647,888 A | 7/1997 | Keogh et al. |
| 5,741,349 A | 4/1998 | Hubble et al. |
| 5,800,592 A | 9/1998 | den Hartog et al. |
| 5,802,097 A | 9/1998 | Gensini et al. |
| 5,938,815 A | 8/1999 | Satchell, Jr. |
| B14,940,488 A | 8/1999 | Maeda et al. |
| 6,143,054 A * | 11/2000 | Dry ............................ 75/500 |

FOREIGN PATENT DOCUMENTS

| | | |
|---|---|---|
| AU | A-42859/89 | 4/1990 |
| AU | A-49307/90 | 9/1990 |
| AU | A-49309.90 | 9/1990 |
| AU | B-74840/91 | 10/1991 |
| AU | B-90957/91 | 8/1992 |
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 422 309 A1 | 4/1991 |
| EP | 541 269 A1 | 5/1993 |
| EP | 592 830 A1 | 4/1994 |
| EP | 657 550 | 6/1995 |
| GB | 2 043 696 A | 10/1980 |
| GB | 2 088 892 A | 6/1982 |
| WO | WO 89/01981 | 3/1989 |
| WO | WO 92/12265 | 7/1992 |
| WO | WO 93/06251 | 4/1993 |
| WO | WO 94/19497 | 9/1994 |
| WO | WO 96/19591 | 6/1996 |
| WO | WO 96/31627 | 10/1996 |
| WO | WO 97/17473 | 5/1997 |
| WO | WO 97/20958 | 6/1997 |
| WO | WO 97/23656 | 7/1997 |
| WO | WO 98/27232 | 6/1998 |
| WO | WO 98/27239 | 6/1998 |
| WO | WO 99/16911 | 4/1999 |

* cited by examiner

PROCESS AND AN APPARATUS FOR PRODUCING METALS AND METAL ALLOYS

The present invention relates to a process for producing molten metal (which term includes metal alloys), in particular, although by no means exclusively iron, from a metalliferous feed material, such as ores, partly reduced ores and metal-containing waste streams, in a metallurgical vessel containing a molten bath.

The present invention relates particularly to a process and an apparatus for producing molten metal from a metalliferous feed material which is based on the combination of:

(a) a means which partially reduces and at least partially melts the metalliferous feed material; and (b) a means which completes reduction of the molten partially-reduced feed material.

One example of a pre-reduction/melting means is a cyclone converter.

One example of a reduction means is a vessel that contains a molten bath.

U.S. Pat. No. 4,849,015 of Fassbinder et al and U.S. Pat. No. 5,800,592 of Den Hartog et al disclose particular proposals for producing molten iron from iron ore using the above combination of pre-reduction/melting means and reduction means.

One object of the present invention is to provide an alternative process/apparatus for producing molten iron from iron ore which is based on the above combination of pre-reduction/melting means and reduction means.

According to the present invention there is provided a process for producing metals from a metalliferous feed material which includes the steps of partially reducing and at least partially melting the metalliferous feed material in a pre-reduction/melting means and completely reducing the partially reduced feed material in a reduction means, which reduction means includes a vessel that contains a molten bath having a metal layer and a slag layer on the metal layer, and which process is characterised by:

(a) injecting solid carbonaceous material with a carrier gas into a metal rich region of the molten bath;

(b) causing upward movement of splashes, droplets, and streams of material from the metal layer which:

(i) promotes mixing of material from the metal layer in the slag layer and mixing of material from the slag layer in the metal layer; and (ii) extends into a space above the molten bath to form a transition zone;

(c) injecting an oxygen-containing gas into the vessel and post-combusting part of a reaction gas generated in the molten bath;

(d) transferring at least part of the hot reaction gas from the reduction means to the pre-reduction/melting means as a reducing gas and partially reducing the metalliferous feed material; and (e) injecting an oxygen-containing gas into the pre-reduction/melting means and post-combusting a part of the reaction gas and thereby generating heat which at least partially melts the partially-reduced metalliferous feed material.

The term "metal rich region" is understood herein to mean the region (or regions) of the molten bath that has a high concentration of metal. By way of example, the metal layer is one metal rich region.

The term "metal layer" is understood herein to mean that region of the bath that is predominantly metal. Specifically, the term covers a region or zone that includes a dispersion of molten slag in a metal continuous volume.

The term "slag layer" is understood herein to mean that region of the bath that is predominantly slag. Specifically, the term covers a region or zone that includes a dispersion of molten metal in a slag continuous volume.

The term "transition zone" is understood herein to mean a gas continuous volume with splashes, droplets, and streams of molten material (which is at least predominantly slag) therein.

One option for generating the upward movement of splashes, droplets and streams of molten material from the metal layer in step (b) is to inject the solid carbonaceous material and carrier gas in step (b) via one or more than one lance/tuyere that extend downwards towards the metal layer.

More preferably the one or more than one lance/tuyere extend through side walls of the vessel and are angled inwardly and downwardly towards the metal layer.

It is preferred that the injection of solid carbonaceous material and carrier gas into the metal layer be sufficient to generate upward movement of splashes, droplets and streams of molten material in a fountain-like manner.

The injection of solid carbonaceous material and carrier gas into the metal layer via the downwardly extending lance(s)/tuyere(s) has the following consequences:

(i) the momentum of the solid carbonaceous material/ carrier gas causes the solid carbonaceous material and gas to penetrate the metal layer;

(ii) the solid carbonaceous material, typically coal, is devolatilised and thereby produces gas in the metal layer;

(iii) carbon predominantly dissolves into the metal and partially remains as solid;

(iv) the gases transported into the metal layer and generated via devolatilisation produce significant buoyancy uplift of material from the metal layer which results in the above-described upward movement of splashes, droplets and streams of material, and these splashes, droplets, and streams entrain further slag as they move through the slag layer.

The material referred to in paragraph (d) includes molten metal (which includes dissolved carbon) and molten slag that is drawn into the metal layer from above the metal layer as a consequence of solid/gas injection.

Another option, although by no means not the only other option, to generate the above-described upward movement of splashes, droplets, and streams of material is to inject solid carbonaceous material and carrier gas via one or more than one tuyere in the bottom of the vessel or in side walls of the vessel that contact the metal layer.

Preferably, the pre-reduction/melting means is positioned above the reduction means and communicates with the reduction means so that at least partially molten, partially reduced metalliferous feed material drains downwardly into the reduction means and, more particularly, drains into the vigorously mixed central region of the slag layer in the molten bath. The applicant believes that this leads to more efficient smelting of the pre-reduced material.

Preferably with this arrangement hot reaction gas generated in the reduction means flows upwardly into the pre-reduction/melting means.

As indicated above, the upward movement of splashes, droplets and streams of material from the metal layer promotes mixing of material from the metal layer in the slag layer and mixing of material in the slag layer in the metal layer. Preferably, the extent of mixing is sufficient so that the slag layer is more or less homogeneous in terms of composition and temperature.

The mixing of material between the layers promotes reduction of metal oxides present in the molten bath by dissolved carbon in metal. In this connection the injection of solid carbonaceous material into the metal layer ensures that there are high levels of dissolved carbon (and possibly solid carbon) in the metal layer and that, as a consequence, the metal layer is strongly reducing.

It is preferred that the level of dissolved carbon in metal be greater than 3.5 wt %.

Preferably the process includes the step of preheating the metalliferous feed material before supplying the metalliferous feed material into the pre-reduction/melting means.

Preferably the process includes discharging reaction gas from the pre-reduction/melting means as an off-gas and preheating the metalliferous feed material with the off-gas, either hot or cold.

Preferably steps (c) and (e) of injecting the oxygen-containing gas into the vessel and the pre-reduction/melting means post-combust the reaction gas generated in the molten bath to a post-combustion level of at least 70%.

The term "post-combustion" means:

$$\frac{[CO_2] + [H_2O]}{[CO_2] + [H_2O] + [CO] + [H_2]}$$

where:

$[CO_2]$=volume % of $CO_2$ in the reaction gas;
$[H_2O]$=volume % of $H_2O$ in the reaction gas;
$[CO]$=volume % of $CO$ in the reaction gas; and
$[H_2]$volume % of $H_2$ in the reaction gas.

More particularly, the term "post-combustion" in the context of post-combustion in the vessel also means post-combustion in the absence of any addition of supplementary carbonaceous material for other purposes.

Preferably injection of oxygen-containing gas into the vessel in step (c) is via one or more than one lance/tuyere that extend downwardly and inwardly into the vessel and are set back sufficiently to be clear of material flowing downwardly from the pre-reduction/melting means into the vessel.

The transition zone is important for three reasons.

Firstly, the ascending and thereafter descending splashes, droplets and streams of material are an effective means of transferring to the molten bath the heat generated by post-combustion of reaction gas in the vessel.

Secondly, the material, and particularly the molten slag, in the transition zone is an effective means of minimising heat loss by radiation via the side walls of the vessel.

Thirdly, dust containing carbon in the transition zone reduces heat loss by radiation to the side walls of the vessel.

Preferably, the vessel includes:

(a) tap holes for discharging molten metal and slag from the vessel; and (b) one or more than one outlet for transferring reaction gas to the pre-reducing/melting means.

It is preferred that the oxygen-containing gas be oxygen.

According to the present invention there is also provided an apparatus for carrying out the above-described process.

More particularly the present invention provides an apparatus for producing metals from a metalliferous feed material which includes: a pre-reduction/melting means which partially reduces and at least partially melts the metalliferous feed material and a reduction means which completely melts and reduces the at least partially molten and partially reduced feed material; which reduction means includes a vessel that contains a molten bath having a metal layer and a slag layer on the metal layer; which pre-reduction/melting means is positioned directly above the vessel and communicates with the vessel whereby at least partially molten and partially reduced feed material flows downwardly into a central region of the vessel; and which reduction means further includes:

(a) one or more than one lance/tuyere which inject solid carbonaceous material with a carrier gas into a metal rich region of the molten bath;

(b) one or more than one lance/tuyere which inject oxygen-containing gas into the vessel that post-combusts reaction gas generated in the vessel, the one or more than one lance/tuyere extending downwardly and inwardly into the vessel and being positioned so as to minimise contact with at least partially molten and partially reduced feed material flowing downwardly from the pre-reduction/melting means; and (c) one or more than one lance/tuyere which inject oxygen-containing gas into the pre-reduction/melting means that post-combusts at least a part of the reaction gas from the vessel.

Figure 2:
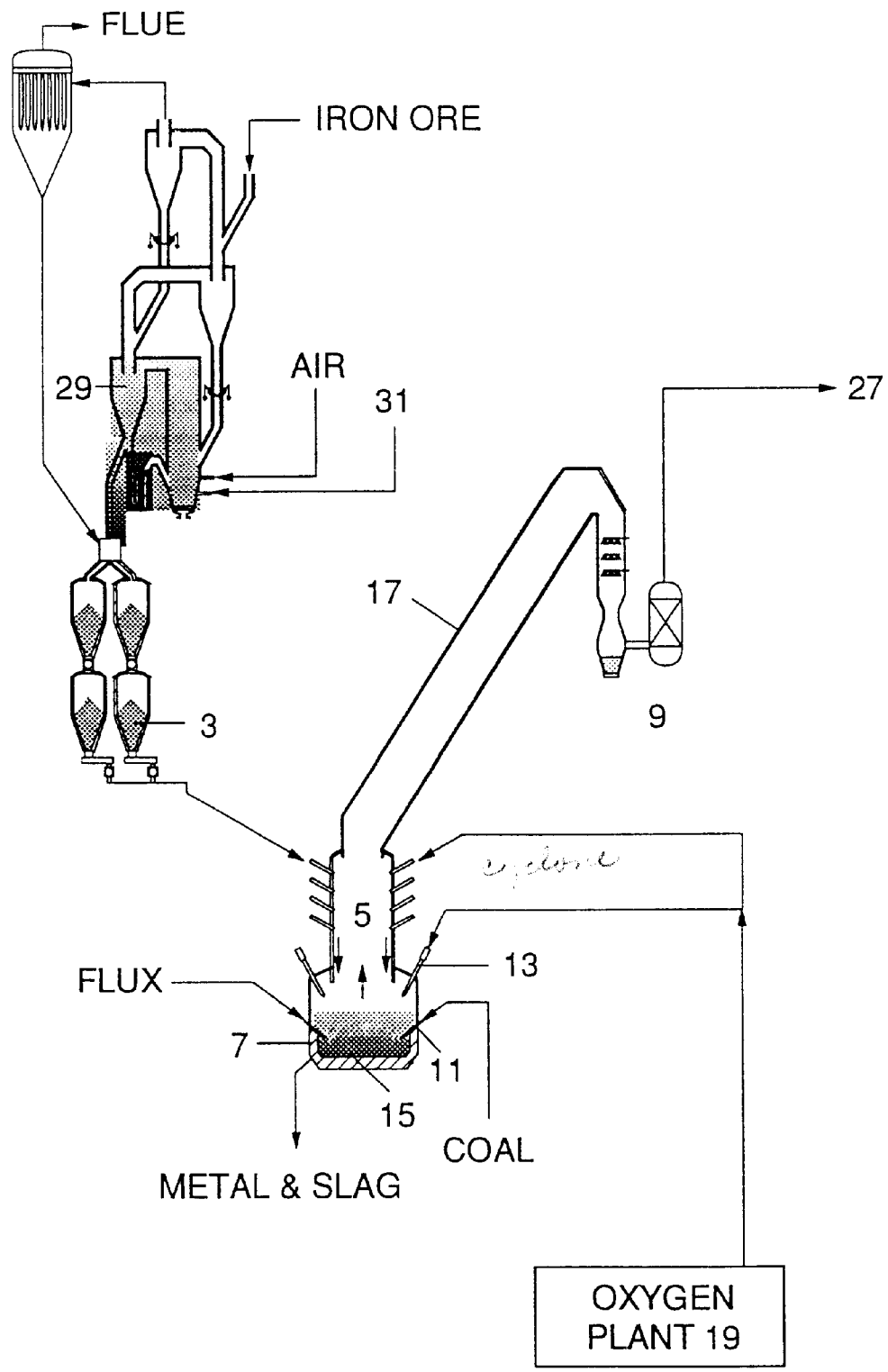

The present invention is described further by way of example with reference to the accompanying drawings, of which:

FIG. 1 is a flowsheet, in largely schematic form, of one preferred embodiment of the process and the apparatus of the present invention; and FIG. 2 is a flowsheet, in largely schematic form, of another preferred embodiment of the process and the apparatus of the present invention.

The following description is in the context of producing molten iron from iron ore and it is understood that the present invention is not limited to this application and is applicable to any suitable metalliferous material.

With reference to FIG. 1, iron ore is transferred from a series of storage bins 3 into a pre-reduction/melting means that is in the form of a cyclone converter 5 and is partially reduced (by way of example, up to FeO) and at least partially melted in the cyclone converter 5.

The cyclone converter 5 is positioned directly above a reduction means that is in the form of:

(a) a metallurgical vessel 7 which contains a molten bath 15 having a metal layer and a slag layer and which has a suitable means (not shown) for tapping molten metal and slag and an outlet for reaction gas that opens directly into the cyclone converter 5; and (b) lances/tuyeres 11 for injecting solid carbonaceous material and optionally fluxes into the vessel 7 and lances/tuyeres 13 for injecting oxygen into the vessel 7, which lances/tuyeres 11, 13 extend downwardly and inwardly into the vessel through the side wall of the vessel.

A suitable form of the vessel 7 and the lances/tuyeres 11, 13 and a suitable process for reducing metalliferous feed material in the vessel 7 is described in general terms in commonly assigned U.S. patent application Ser. Nos. 09/535,665 and 09/462,282, the disclosures of which are incorporated by reference.

The process flowsheet of FIG. 1 includes injection of solid material and carrier gas into the metal layer 15 via the lances/tuyeres 11. A particular feature of the preferred process flowsheet is that the injected solid material is confined to solid carbonaceous material (typically coal) and optionally one or more than one slag forming agent (typically lime). The gases that are generated by and transported into the metal layer as a consequence of the injection of solid carbonaceous material and carrier gas into the metal layer produce significant buoyancy uplift of molten metal, solid carbon, and molten slag (drawn into the metal layer as a consequence of solid/gas injection) from the metal layer which generates upward movement of splashes, droplets and streams of molten material and solid carbon, and these splashes, droplets and streams entrain slag as they move through the slag layer.

The buoyancy uplift of molten material and solid carbon causes substantial agitation in the metal layer and the slag layer, with the result that the slag layer expands in volume. The extent of agitation is such that there is strong mixing of material from the metal layer in the slag layer and strong mixing of material from the slag layer in the metal layer.

In addition, the upward movement of splashes, droplets and streams of material caused by the buoyancy uplift of molten metal, solid carbon, and molten slag extends into the gas space above the molten material in the vessel and form a transition zone.

The diameter of the cyclone converter 5 is relatively small compared to that of the vessel 7 and the cyclone converter 5 is positioned centrally above the vessel 7. Accordingly, the at least partially molten, partially-reduced iron ore produced in the cyclone converter 5 flows downwardly into the central region of the molten bath 15 and is completely reduced in the molten bath 15. The mixing of material between the metal layer and the slag layer ensures that complete reduction is achieved effectively and efficiently.

The reactions that occur in the molten bath 15 in the vessel 7 generate reaction gas (such as CO and $H_2$) and the gas moves upwardly through the vessel 7. Oxygen produced in an oxygen plant 19 is injected into the gas space in the vessel 7 above the molten bath 15 via the lances/tuyeres 13 and post-combusts a part of the reaction gas in the transition zone and other sections of the gas space. The heat is transferred to the ascending and thereafter descending splashes, droplets and streams of material and the heat is then transferred to the metal layer when the metal/slag returns to the metal layer. In order to avoid damage by contact with material flowing downwardly from the cyclone converter 5, the lances/tuyeres 5 are set back to be clear of such downwardly flowing material.

The post-combusted reaction gas produced in the vessel 7 flows upwardly into the cyclone converter 5 and acts as a reducing gas which partially reduces the iron ore supplied to the cyclone converter 5.

In addition, oxygen produced in the oxygen plant 19 is injected into the cyclone converter 5 and post-combusts at least part of the reaction gas in the cyclone converter 5 and generates heat that melts the partially-reduced iron ore.

The combined level of post-combustion in the vessel 7 and the cyclone converter 5 is at least 70%.

An off-gas discharges from the cyclone converter 5 via a duct 17. The duct 17 includes a water cooling assembly 9 which initially cools the off-gas by means of water panels and thereafter quenches the off-gas and thereby removes entrained solids from the off-gas and reduces the water vapour content of the off-gas.

The quenched off-gas is transferred via a line 27 and is used as a fuel gas or vented flue gas.

The process flowsheet shown in FIG. 2 includes all of the components of the flowsheet shown in the figure.

In addition, in the process flowsheet shown in FIG. 2 the iron ore is preheated in a preheater assembly 29 prior to supplying the iron ore to the cyclone converter 5. The preheater assembly 29 operates with a part of the fuel gas from the water cooling assembly 9 which is supplied via a line 31. The use of a preheater assembly 29 is an advantage in terms of productivity and operational costs, particularly in situations where the iron ore has high levels of loss of ignition (for example, crystalline water). Moreover, in situations where the iron ore has high levels of loss of ignition, the preheater assembly 29 has the advantage that it minimises thermal decrepitation of iron ore particles when the particles are exposed to high temperatures in the cyclone converter 5.

The Table set out below provides heat and mass balance calculations for the process flowsheets of FIGS. 1 and 2 under the stated operating conditions.

| | Figure 1 flowsheet | Figure 2 flowsheet |
|---|---|---|
| Preheater assembly (29) | | |
| Fines Feed | Not applicable | 278 tph @ 25 C |
| Pre-reduction/ melting means (5) | | |
| Fines Feed | 261 tph @ 25 C | 266 tph @ 700 C |
| Oxygen | 37.1 kNm3/h | 28.5 kNm3/h |
| Offgas | 252 kNm3/h @ 1800 C & 77% post combustion | 222 kNm3/h @ 1800 C & 76% post combustion |
| Reduction means (7, 11, 13, 15) | | |
| Feed rate | 221 tph @ 1600 C & 22% pre-reduction | 231 tph @ 1600 C & 22% Pre-reduction |
| Oxygen | 71.1 kNm3/h | 63.0 kNm3/h |
| Coal | 113.0 tph | 105.0 tph |
| Flux | 7.1 tph | 7.8 tph |
| Offgas | 226 kNm3/h @ 31.5% post combustion | 208 kNm3/h @ 34.9% post combustion |
| Metal | 181 tph @ 1500 C & 4.0% carbon | 188 tph @ 1500 C & 4.0% carbon |
| Slag | 21 tph | 21 tph |
| Offgas from Pre- reduction/melting means (5) | | |
| Hood cooling | 132 MW | 118 MW |
| Gas ex Scrubber | 211 kNm3/h @ 72% post combustion | 88 kNm3/h @ 71% post combustion |

The iron ore was sourced from North America and contained 68.2% iron, 0.6% $SiO_2$ and 0.95% $Al_2O_3$ on a dry basis.

The coal had a heating value of 33.9 MJ/kg, an ash content of 5.4% and a volatiles level of 14%. Other characteristics included 90.0% total carbon, 2.0% $H_2O$, 1.3% $N_2$, 3.2% $O_2$ and 4.0% $H_2$.

Many modifications may be made to the preferred embodiments of the process and apparatus of the present invention as described above without departing from the spirit and scope of the present invention.

By way of example, the present invention is not limited to the use of cyclone converters and extends to any suitable pre-reduction/melting means.

Furthermore, whilst the above described embodiments include injecting all of the solid carbonaceous material into the metal layers in the vessels 7, it can readily be appreciated that the present invention extends to embodiments in which part of the solid carbonaceous material is top-charged or otherwise supplied to the vessels 7.

Furthermore, whilst the above described embodiments are confined to injecting carrier gas and solid carbonaceous material and optionally slag forming agents into the metal layer via lances/tuyeres 11, it can readily be appreciated that the present invention extends to embodiments in which other solid materials, such as metalliferous feed material, are injected into the metal layers.

What is claimed is:

1. A process for producing iron-containing metals from a metalliferous feed material which includes the steps of partially reducing and at least partially melting the metalliferous feed material in a pre-reduction/melting means and completely reducing the partially reduced feed material in a reduction means, which pre-reduction/melting means is positioned directly above the reduction means and communicates with the reduction means so that at least partially molten, partially reduced feed material flows downwardly into a central region of the reduction means, which reduction means includes a vessel that contains a molten bath having a metal layer and a slag layer on the metal layer, and which process further comprises:

(a) injecting solid carbonaceous material and carrier gas into a metal rich region of the molten bath via one or more than one lance/tuyere that extend downwardly towards the metal layer, the injection of carbonaceous material and carrier gas causing upward movement of splashes, droplets, and streams of material from the metal layer which:
    (i) promotes mixing of material from the metal layer in the slag layer and mixing of material from the slag layer in the metal layer; and
    (ii) extends into a space above the molten bath to form a transition zone;
  (b) injecting an oxygen-containing gas into the vessel and post-combusting part of a reaction gas generated in the molten bath via one or more than one lance/tuyere extending downwardly and inwardly into the vessel and being positioned so as to minimise contact with at least partially molten and partially reduced feed material flowing downwardly from the pre-reduction/melting means;
  (c) allowing at least part of the reaction gas generated in the molten bath to flow upwardly from the reduction means into the pre-reduction/melting means and partially reduce the metalliferous feed material in the pre-reduction/melting means; and
  (d) injecting an oxygen-containing gas into the pre-reduction/melting means and post-combusting a part of the reaction gas and thereby generating heat which at least partially melts and partially reduces metalliferous feed material and generates the at least partially molten, partially reduced feed material that flows downwardly into the reduction means; and whereby steps (b) and (d) post-combust the reaction gas generated in the molten bath to a post-combustion level of at least 70%.

2. The process defined in claim 1 includes injecting solid carbonaceous material and carrier gas via one or more than one tuyere in the bottom of the vessel or in side walls of the vessel that contact the metal layer.

3. The process defined in claim 1 includes the step of preheating the metalliferous feed material before supplying the metalliferous feed material into the pre-reduction/melting means.

4. The process defined in claim 3 includes discharging reaction gas from the pre-reduction/melting means as an off-gas and preheating the metalliferous feed material with the off-gas.

5. The process defined in claim 1 wherein step (b) includes injecting the oxygen-containing gas into the vessel via one or more than one lance/tuyere that extend downwardly and inwardly into the vessel and are set-back sufficiently to be clear of material flowing downwardly from the pre-reduction/melting means into the vessel.

* * * * *